(12) United States Patent
Burns et al.

(10) Patent No.: US 7,423,409 B1
(45) Date of Patent: Sep. 9, 2008

(54) BATTERY POLARITY MANAGEMENT

(75) Inventors: Charles E. Burns, Lake Saint Louis, MO (US); David P. Garner, Ellisville, MO (US); Limin Wang, O'Fallon, MO (US); Gary R. Ware, Newton, MA (US)

(73) Assignee: American Power Conversion Corporation, West Kingston, RI (US)

( * ) Notice: Subject to any disclaimer, the term of this patent is extended or adjusted under 35 U.S.C. 154(b) by 0 days.

(21) Appl. No.: 11/701,808

(22) Filed: Feb. 2, 2007

Related U.S. Application Data

(62) Division of application No. 10/882,487, filed on Jul. 1, 2004, now Pat. No. 7,317,298.

(60) Provisional application No. 60/484,346, filed on Jul. 1, 2003.

(51) Int. Cl.
*H01M 10/46* (2006.01)
(52) U.S. Cl. ............................................. 320/132
(58) Field of Classification Search ............... 320/116, 320/118, 132; 324/426, 430, 433
See application file for complete search history.

(56) References Cited

U.S. PATENT DOCUMENTS

| 5,541,495 | A | * | 7/1996 | Gali | 320/165 |
| 6,249,125 | B1 | * | 6/2001 | Haddad et al. | 324/426 |
| 6,518,725 | B2 | * | 2/2003 | Marten | 320/116 |
| 6,611,774 | B1 | | 8/2003 | Zaccaria | |

* cited by examiner

*Primary Examiner*—Edward Tso
(74) *Attorney, Agent, or Firm*—Townsend and Townsend and Crew LLP

(57) ABSTRACT

A battery monitor for use with a battery includes an input configured to receive a voltage from the battery, an analog to digital converter (ADC) coupled to the input and configured to convert analog voltages received through the input into digital indications of levels of the analog voltage, and a processor coupled to the ADC to receive the digital indications of the levels of the analog voltage of the battery and configured to manipulate the received digital indications to reduce inaccuracies introduced by the ADC in the received digital indications of the levels of the analog voltage relative to actual levels of the analog voltage during discharge of the battery, the processor being further configured to provide an output indicative of a determined level of the analog voltage.

13 Claims, 7 Drawing Sheets

BATTERY POLARITY MANAGEMENT

CROSS-REFERENCE TO RELATED ACTIONS

This divisional application claims priority to U.S. application Ser. No. 10/882,487, filed Jul. 1, 2004 now U.S. Pat. No. 7,317,298, which claims the benefit of U.S. Provisional Application No. 60/484,346 filed Jul. 1, 2003, which are incorporated here by reference.

BACKGROUND OF THE INVENTION

Batteries are used in a wide range of electrical systems, e.g., uninterruptible power supply (UPS) systems. Batteries can be used to provide backup power, which discharges the batteries, and may be charged to replenish depleted energy used to power electronic equipment.

The terminal voltage of batteries during discharge may be used to recognize problems and assess and predict battery capacity. Small voltage changes at the battery terminals can reveal information such as the battery internal resistance and the remaining capacity of the battery if combined with other information such as the elapsed time since the beginning of discharge and level of discharge current.

The voltage can be measured and converted from analog (continuous) to digital (samples) and analyzed by a processor to diagnose/predict problems. Analog-to-digital converters (ADCs) have inherent amounts of undesirable noise created by the sampling process that affects the accuracy and usefulness to a computer of the signals output by ADCs. The noise causes the digital outputs to change sample to sample in both positive and negative directions. This occurs even though an actual battery terminal analog voltage of interest remains the same or changes only in a negative direction during a discharge. If the rendered terminal voltage value contains noise that is in excess of the resolution that is used to assess battery performance, then the rendered value is unreliable for assessing battery performance.

A factor that influences battery operation is ambient temperature. A change in ambient temperature near a battery results, after a time delay, in a change in the battery's internal temperature. The time delay may be thought of as a thermal propagation delay; i.e., the time it takes for changes in the ambient temperature to slowly propagate through the battery case (thermal resistance) and into the internal part of the battery. Assuming a step increase in ambient temperature, the thermal delay forms an S-curve of internal battery temperature versus time where internal battery temperature takes time (typically several minutes) to reach the ambient temperature. The S-curve results from the internal temperature being constant, then increasing due to the increase in ambient temperature, first slowly and then more rapidly, and then leveling off, asymptotically approaching a steady state temperature. Because the battery case provides a barrier to the ambient heat from reaching the internal part of the battery, the slope of the curve is initially small and increases with time, forming an S-shaped curve (see FIG. 4).

Internal battery temperature affects operational characteristics of the battery. As battery temperature increases, the lead-acid battery voltage will increase and a proportionately lower charger float voltage will maintain the same charge current. Conversely, as battery temperature decreases, a higher charger float voltage is used to maintain a constant charge current. Increasing float voltage can warm the battery's internal temperature. If the input charge energy exceeds the battery's ability to convert the energy to chemical energy or to dissipate the excess energy, thermal runaway may occur. If the conditions are not corrected, the current may continue to increase until it is removed or the circuit opens, e.g., due to a rupture or explosion.

A battery, as used in this document, may comprise multiple batteries. The batteries may be connected in series to provide a cumulative voltage, and the series of batteries may be collectively considered as a single battery for many purposes.

There may be confusion, however, when maintenance personnel attempt to correlate actual physical location of individual batteries within a string of batteries with indications from associated monitoring equipment. The individual batteries may or may not be labeled with identifiers such as #1, #2, #3, yet the monitoring equipment adopts some means of relating an alarm, message or data to a specific battery. Hundreds of individual polarized units are often connected in series. The string terminal voltage is the sum of all the individual terminal voltages. Each of the individual units has a negative and positive terminal and these terminals are connected together in a negative to positive fashion to result in a string positive output at one end and a string negative output at the extreme opposite end. Monitoring equipment is connected to the individual battery terminals to enable measurement and testing at the individual battery level. The individual batteries are frequently assigned number labels for the purpose of identification by maintenance and service personnel. The monitoring equipment provides numbered connection wires that are correlated to the physical identification of the individual batteries.

There is, however, often no certainty that identification numbers assigned to the batteries may not be assigned with regard to polarity or reference point. For example, the battery labeled as #1 might start at either end of the string, irrespective of the string's output terminal polarity. The monitoring equipment, though, is polarity sensitive and could be damaged as a result of sensitive electronic components receiving unintended reverse currents from the batteries. Further, if polarity is disregarded, the monitoring equipment may incorrectly associate measured values with the batteries, resulting in maintenance being performed on the wrong batteries and the defective batteries detected by the monitoring equipment remaining in place.

SUMMARY OF THE INVENTION

In general, in an aspect, the invention provides a battery monitor for use with a battery, the monitor including an input configured to receive a voltage from the battery, an analog to digital converter (ADC) coupled to the input and configured to convert analog voltages received through the input into digital indications of levels of the analog voltage, and a processor coupled to the ADC to receive the digital indications of the levels of the analog voltage of the battery and configured to manipulate the received digital indications to reduce inaccuracies introduced by the ADC in the received digital indications of the levels of the analog voltage relative to actual levels of the analog voltage during discharge of the battery, the processor being further configured to provide an output indicative of a determined level of the analog voltage.

Implementations of the invention may include one or more of the following features. The processor is configured to disregard a newly-received digital indication of the analog voltage level if the newly-received digital indication is higher than a previous digital indication of the analog voltage level. The processor is configured to store an indication of the level of the analog voltage and the previous digital indication is a lowest digital indication previously stored by the processor. The processor is further configured to store a first indication of the level of the analog voltage and to store a second indication of the level of the analog voltage if a newly-received indication indicates a level of the analog voltage that is lower than the stored indication's level. The second indication's level is between the first indication's level and the newly-received indication's level. The processor is configured to replace the first indication with the first indication minus about 10% of a difference between the first indication's level and the second indication's level. The processor is configured to disregard the newly-received indication of the analog voltage level if the first indication's level is lower than the newly-received indication's level.

In general, in another aspect, the invention provides a method of interpreting a voltage of a discharging battery, the method including receiving an analog voltage from the battery while the battery is discharging, converting the analog voltage into digital indications of levels of the analog voltage, processing the digital indications to reduce inaccuracies introduced by the converting of the levels of the analog voltage relative to actual levels of the analog voltage to determine an estimated level of the analog voltage, and providing an output indicative of the determined level of the analog voltage.

Implementations of the invention may include one or more of the following features. The processing comprises disregarding a newly-received digital indication of the analog voltage level if the newly-received digital indication is higher than a previous digital indication of the analog voltage level. The method further includes storing an indication of the level of the analog voltage, wherein the previous digital indication is a lowest digital indication previously stored. The method further includes storing a first indication of the level of the analog voltage, and storing a second indication of the level of the analog voltage if a newly-received indication indicates a level of the analog voltage that is lower than the stored indication's level. The second indication's level is between the first indication's level and the newly-received indication's level. Storing the second indication comprises replacing the first indication with the first indication minus about 10% of a difference between the first indication's level and the second indication's level. The processing is comprises disregarding the newly-received indication of the analog voltage level if the first indication's level is lower than the newly-received indication's level.

In general, in another aspect, the invention provides a system for estimating internal battery temperature, the system including a battery, a temperature sensor disposed and configured to provide information indicative of an ambient temperature in a vicinity of the battery over time, and a processor coupled to the temperature sensor and configured to store indications of the ambient temperature based on the information received from the temperature sensor, the indications being separated in time, and to estimate a present internal temperature of the battery based on at least two indications of the ambient temperature, at least one of the at least two indications being previously stored by the processor.

Implementations of the invention may include one or more of the following features. The processor is configured to determine a sequence of temperatures including the estimated present internal temperature, each of the temperatures in the sequence of temperatures being based on a prior value of itself and on a temperature in the sequence preceding itself. Each of the temperatures in the sequence is replaced each time a new indication of the ambient temperature is stored by the processor, each temperature in the sequence being replaced by a temperature equal to a weighted average of the respective temperature's prior value and the temperature in the sequence immediately preceding itself. Each of the weighted averages includes a weight factor, there being a first weight factor selected to account for thermal transfer inside the battery and a second weight factor to account for at least one of thermal transfer between an exterior of the battery and the battery, and a thermal mass of the battery.

Implementations of the invention may also include one or more of the following features. The indications are separated in time by at least about one minute. The processor is configured to estimate the present internal battery temperature in a way such that the estimated temperature will vary by approximately exponentially increasing and then asymptotically approaching a steady state value in response to a step increase in the ambient temperature. The system further includes a power device coupled to the battery and to the processor and configured to provide voltage to the battery and to provide information about the voltage provided and a corresponding current provided to the battery, wherein the processor is configured to determine a reference temperature based on the voltage and current provided to the battery from the power device and to compare the reference temperature with the estimated temperature.

In general, in another aspect, the invention provides a method for estimating internal battery temperature, the method including measuring temperature indicative of an ambient temperature in a vicinity of the battery over time, and using values indicative of the ambient temperature for different times and knowledge of at least one thermal characteristic of the battery related to heat transfer from the vicinity of the battery into the battery to estimate a present internal temperature of the battery such that the estimated temperature will vary by approximately exponentially increasing and then asymptotically approaching a steady state value in response to a step increase in the ambient temperature.

Implementations of the invention may include one or more of the following features. Estimating the internal temperature of the battery comprises determining a sequence of temperatures including the estimated present internal temperature, each of the temperatures in the sequence of temperatures being based on a prior value of itself and on a temperature in the sequence preceding itself. The estimating comprises replacing each of the temperatures in the sequence each time a new indication of the ambient temperature is used to estimate the present internal battery temperature, each temperature in the sequence being replaced by a temperature equal to a weighted average of the respective temperature's prior value and the temperature in the sequence immediately preceding itself, with the temperature's prior value being weighted more heavily. Each of the weighted averages includes a weight factor, there being a first weight factor selected to account for thermal transfer inside the battery and a second weight factor to account for at least one of thermal transfer between an exterior of the battery and the battery, and a thermal mass of the battery, the second weight factor providing substantially greater weight than the first weight factor.

Implementations of the invention may also include one or more of the following features. The using comprises using indications of the ambient temperature that are separated in time by at least about one minute. The method further includes providing voltage and a corresponding current to the battery, determining a reference temperature based on the voltage and current provided to the battery, and comparing the reference temperature with the estimated temperature.

In general, in another aspect, the invention provides a system for controlling charge float voltage to a battery, the system including a battery, a temperature sensor disposed and configured to provide information indicative of an ambient temperature in a vicinity of the battery over time, a processor coupled to the temperature sensor and configured to store indications of the ambient temperature based on the information received from the temperature sensor, the indications being separated in time, and to estimate a present internal temperature of the battery based on at least two indications of the ambient temperature, at least one of the at least two indications being previously stored by the processor, and a charger coupled to the processor and to the battery and configured to provide a float voltage to the battery, a value of the float voltage depending upon the estimated present internal temperature of the battery and a desired current value.

Implementations of the invention may include one or more of the following features. The charger is configured to determine the value of the float voltage such that the desired current value of current provided by the charger to the battery will be substantially constant over time.

In general, in another aspect, the invention provides a battery monitoring system including a system input configured to couple to a battery, a switch having first and second switch inputs coupled to the system input and having first, second, third, and fourth switch outputs, circuitry configured to monitor at least one characteristic of the battery, the circuitry having positive and negative inputs coupled to the switch, and a processor coupled to the switch and to the circuitry and configured to: determine a polarity of a voltage provided by the battery through the input and the switch; cause the switch to connect the first and second switch inputs selectively to an appropriate pair of the switch outputs depending upon the determined polarity of the voltage; and cause the circuitry to accept the voltage from the switch after the processor causes the switch to connect the switch inputs to switch outputs.

Implementations of the invention may include one or more of the following features. The processor is configured to cause the switch to connect the first and second switch inputs, respectively, to either the first and third switch outputs or to the second and fourth switch outputs. The positive input of the circuitry is coupled to the first and fourth switch outputs and the negative input is coupled to the second and third switch outputs. The battery comprises a plurality of batteries connected in series, wherein the system input is configured to selectively couple a respective one of the series of the batteries to the switch inputs, and wherein the processor is coupled to the system input and is configured to control the system input to disconnect from all the batteries while the processor causes the switch to change which switch outputs are connected to the switch inputs. The processor is configured to keep the switch in a constant position while causing the system input to cyclically connect to each of the batteries in the series of the batteries.

In general, in another aspect, the invention provides a method of monitoring a series of batteries of arbitrary group polarization, the method including receiving a voltage from a battery of the series of batteries on first and second lines, determining which of the lines is at a relatively higher potential and which of the lines is at a relatively lower potential, coupling a positive input of monitoring equipment to the line determined to be at a relatively higher potential, coupling a negative input of monitoring equipment to the line determined to be at a relatively lower potential, and using the voltage in the monitoring equipment only after the determining and coupling.

Implementations of the invention may include one or more of the following features. The method further includes changing which of the positive and negative inputs of the monitoring equipment is coupled to the first and second lines, respectively, and inhibiting receipt of voltage from the series of batteries on the first and second lines while changing which of the positive and negative inputs of the monitoring equipment is coupled to the first and second lines, respectively. The method further includes selectively connecting each battery of the series of batteries one at a time to the monitoring equipment. Which of the positive and negative inputs of the monitoring equipment that each of the first and second lines is coupled to is the same for each selective connection of the batteries.

Various aspects of the invention may provide one or more of the following capabilities. Noise in detected battery terminal voltage may be reduced. Battery terminal voltage may be more accurately determined than with previous techniques. Battery capacity and battery problems may be more accurately determined and assessed. Abuse of batteries due to undesired charger voltage may be reduced/avoided and thermal battery runaway avoided. Reverse biasing of sensitive battery monitoring equipment may be avoided. Batteries may be connected to monitoring equipment without regard to polarity.

These and other capabilities of the invention, along with the invention itself, will be more fully understood after a review of the following figures, detailed description, and claims.

DETAILED DESCRIPTION OF PREFERRED EMBODIMENTS

Embodiments of the invention provide techniques for measuring and determining battery terminal output voltage during battery discharge. Battery voltage is measured by an analog voltage detector and analog indications of the voltage are converted to a series of digital samples by an analog-to-digital converter (ADC). Digital samples of the battery voltage are provided by the ADC to be analyzed and preferably conditioned to account for noise in the ADC output. Individual sample values of the battery voltage that exceed the previous value are discarded. Individual sample values that are less than the previous sample value are used to determine a new battery terminal voltage value. Only a portion (e.g., 10%) of the previous value is preferably used. This value is subtracted from the previous value to obtain a conditioned digital output value for the battery voltage. Other embodiments for measuring and determining battery terminal output voltage are within the scope of the invention.

Other embodiments of the invention provide techniques for determining internal battery temperature and controlling charge float voltage. Ambient temperature near a battery is measured and a relationship between ambient temperature and internal battery temperature is used to determine the internal battery temperature. A known relationship (e.g., supplied by a manufacturer of a charger) between internal battery temperature, charge float voltage, and charge current is used to determine, for the determined internal battery temperature, a charge float voltage to maintain charge current to the battery substantially constant. Other embodiments for determining internal battery temperature and regulating charge float voltage are within the scope of the invention.

Other embodiments of the invention provide techniques for automatically adapting to different polarities of batteries. A series connection of batteries can be connected to battery monitoring equipment without regard to polarity. A polarity selector of the monitoring equipment automatically adjusts to the polarity of the series-connected batteries to connect the batteries to other portions of the monitoring equipment in a desired polarity to be useful and to help prevent damage to the monitoring equipment due to undesired reverse biasing of electrical components. Other embodiments for adapting to different battery polarities are within the scope of the invention.

Figure 1:
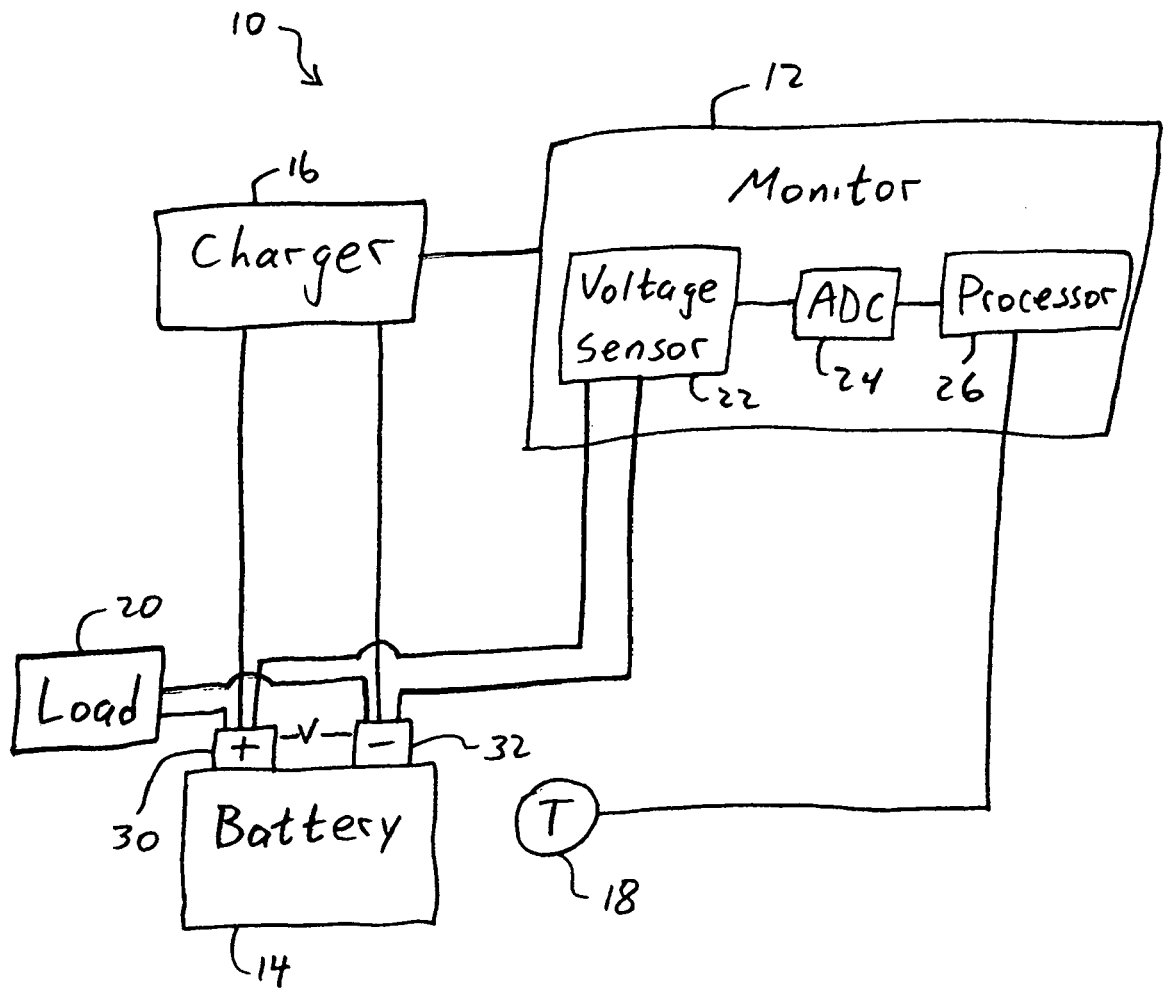
FIG. 1 is a simplified block diagram of a battering monitoring and charging system.

Referring to FIG. 1, a battery charging and monitoring system 10 includes an equipment monitor 12, a battery 14, a charger 16, a temperature sensor 18, and a load 20. The monitor 12 includes a voltage sensor 22, and ADC 24, and a processor 26. The battery 14 may be a single battery or may be a combination of multiple batteries. The battery 14 can provide energy to the load 20 to power electronic equipment in the load. The processor 26 includes computer-readable memory that includes computer-readable instructions for causing the processor 26 to perform functions as described below.

While powering the load 20, the battery 14 discharges and a voltage V between terminals 30, 32 of the battery 14 drops. The voltage V typically decreases relatively slowly, e.g., typically dropping less than 10% of its value each sampled portion of a second. Further, the voltage V does not increase during a discharge event.

The sensor 22 and the ADC 24 are configured to detect and provide indications of the voltage V. The voltage sensor 22 is configured to measure the voltage V periodically, e.g., several (such as three or four) times per second and to provide an analog indication of the measured voltage V to the ADC 24. The ADC 24 is configured to convert the analog indication from the sensor 22 to a group of digital samples representing the actual voltage V and to provide the digital samples to the processor 26. The battery 14 may include multiple batteries and the sensor 22 can be configured to cyclically sense the voltage from individual batteries that make up the battery 14. For example, the sensor 22 may switch to a different battery at a rate of about 1 Hz and temperatures may be sampled by the ADC 24 at a rate of about 5 Hz.

Figure 2:
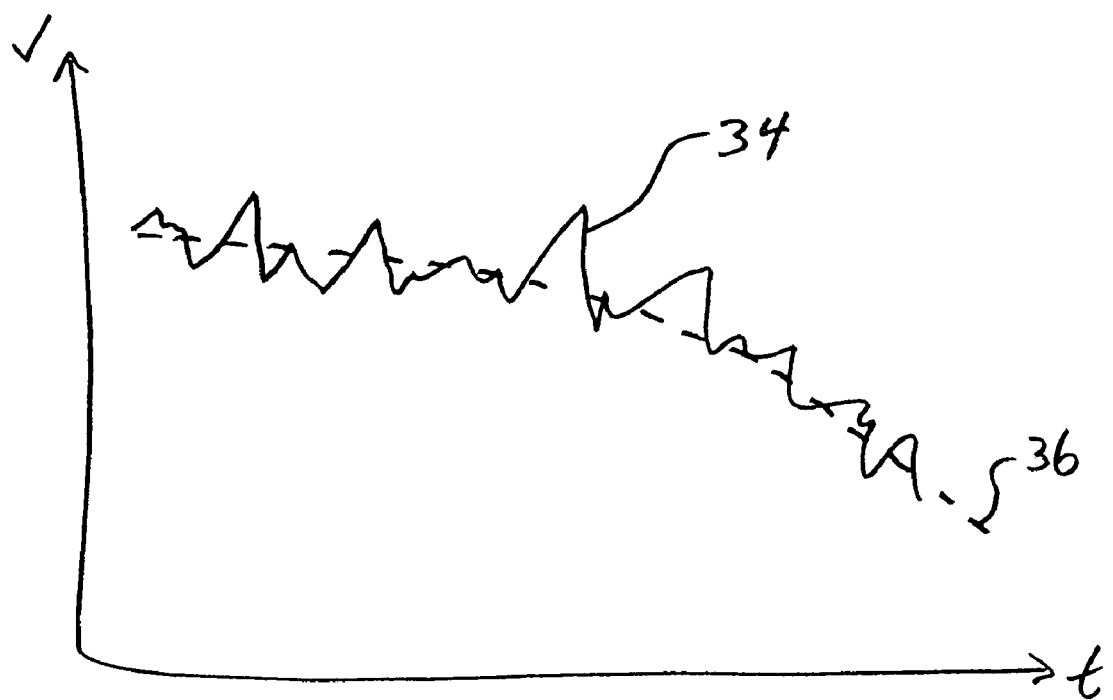
FIG. 2 is a graph of battery voltage versus time during battery discharge.

The processor 26 is configured to use the indications of the voltage V from the ADC 24 to extract useful information. As the voltage indications from the ADC 24 include a relatively high amount of noise (high compared to the variation in the actual voltage V between indications), the indicated voltage V may differ from the actual voltage V, including appearing to increase during a discharge event, or appearing to decrease more than is realistic. Referring to FIG. 2, an exemplary plot 34 of captured values of the voltage V over time without manipulation by the processor shows apparent rises in the voltage V during discharge and unrealistic decreases of the voltage V. The processor 26 is configured (through software instructions) to leverage the knowledge that battery terminal voltage either remains the same or declines during battery discharge and that the decline is in relatively small amounts. The processor 26 is configured to capture and analyze several digital indications of the voltage V every second during an ongoing discharge event. In particular, as described more fully below, the processor 26 can discard captured values and use captured values to determine a new value for the voltage V and overwrite the current value with the new value, the new value becoming the currently-stored conditioned value.

Figure 3:
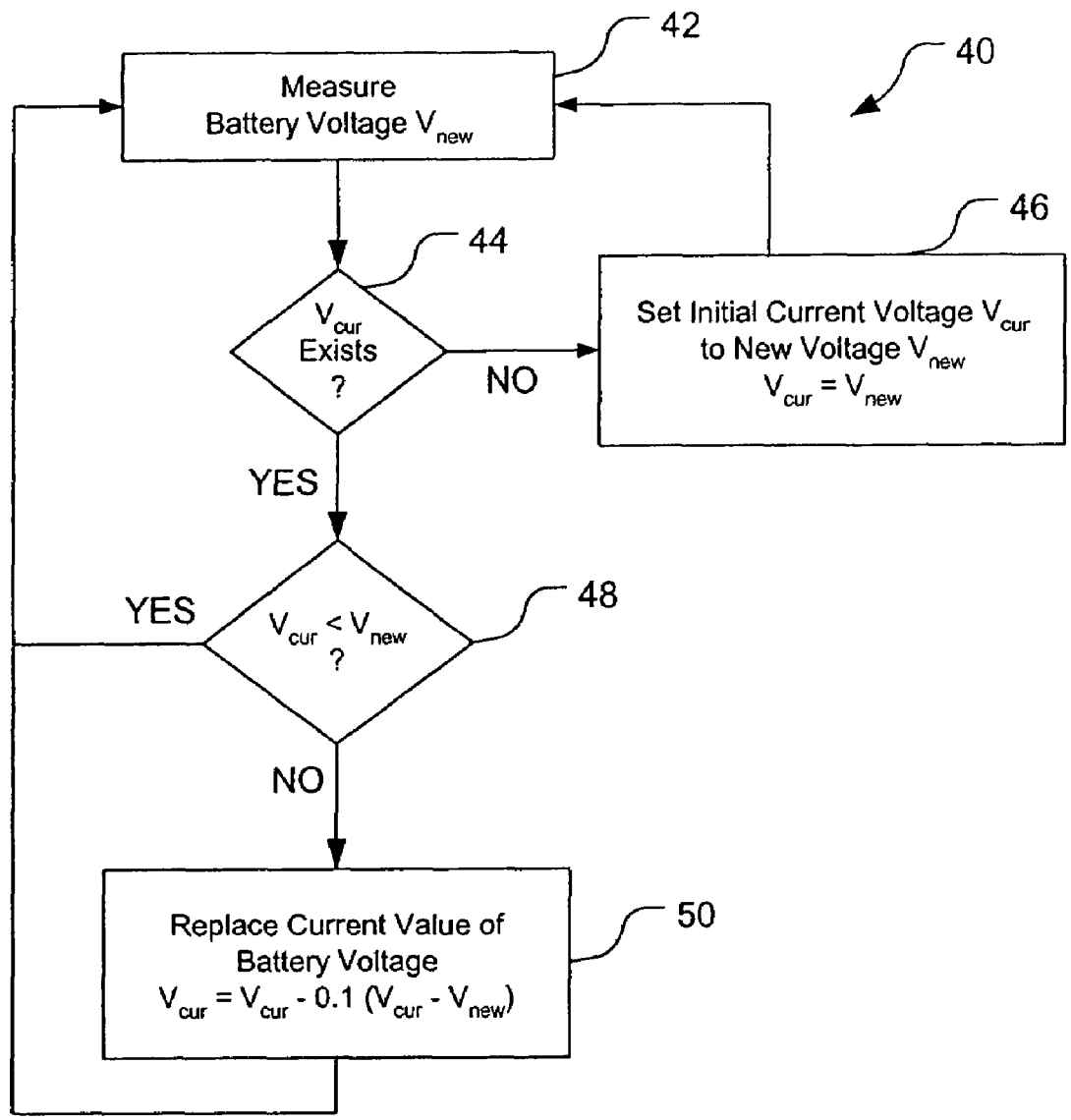
FIG. 3 is a block flow diagram of monitoring and adjusting battery voltage level indications monitored during battery discharge.

In operation, referring to FIG. 3, with further reference to FIGS. 1-2, a process 40 for capturing values for the voltage V and manipulating the captured values using the system 10 includes the stages shown. The process 40, however, is exemplary only and not limiting. The process 40 may be altered, e.g., by having stages added, removed, or rearranged.

At stage 42, values of the voltage V are measured and provided to the processor 26. The sensor 22 measures the voltage V and the ADC 24 digitizes the measured analog values provided by the sensor 22 into a group of the digital samples and provides the sample values $V_{new}$ to the processor 26.

At stage 44, an inquiry is made as to whether a value $V_{cur}$ for the voltage V is currently stored in the memory. If so, then the process 40 proceeds to stage 48. Otherwise, the process proceeds to stag 46 to set an initial value for the voltage V. The processor 26 saves, in the memory, an initial voltage value $V_{cur}$, e.g., the captured value in a selected initial time frame, e.g., two seconds. Other time frames and other values (e.g., an average of the captured values) may be used by the processor 26 to set the initial stored value of the voltage V. The process returns to stage 42 to obtain a new value for the voltage V.

At stage 48, an inquiry is made as to whether the newly captured value $V_{new}$ of the voltage V is greater than or equal to the currently-stored value $V_{cur}$ (i.e., is the current value $V_{cur}$ less than the new value $V_{new}$). If the new value is the same or higher than the currently-stored value, then the process 40 ignores the newly-captured value $V_{new}$ of the voltage V as this defies knowledge of practical realities of battery discharge (the new value $V_{new}$ is irrational). If the new value $V_{new}$ is lower than the current value $V_{cur}$, then the process proceeds to stage 50.

At stage 50, the current value $V_{cur}$ of the voltage V is replaced with a value based upon the newly-captured value $V_{new}$ and the current value $V_{cur}$. The processor 26 replaces the current value $V_{cur}$ with the current value $V_{cur}$ minus 10% of the difference between the current value $V_{cur}$ and the new value $V_{new}$ ($V_{cur}=V_{cur}-0.1\cdot(V_{cur}-V_{new})$). The weighting of 10% applied to the difference between the two voltage values $V_{cure}$, $V_{new}$ is exemplary only and other values could be used, as well as other formulas for replacing the currently-stored value $V_{cur}$. For example, the current value $V_{cur}$ could be replaced by the new value $V_{new}$ plus some amount, or even by the newly-captured value $V_{new}$ itself, although this is not preferred. A plot 36 of the value of the voltage V as influenced by the algorithm implemented by the processor 26 shows that the voltage V follows the same pattern as the raw voltage value data plot 34, but without the voltage V increasing over time.

Referring again to FIG. 1, the processor 26 is configured to provide accurate temperature information to the battery charger for the purpose of correcting the float voltage as a function of internal battery temperature as derived from ambient temperature in the vicinity of the battery 14. The temperature sensor 18 is configured and connected to measure the ambient temperature adjacent the battery 14 and to provide an output signal indicating the temperature to the processor 26. The processor 26 combines the measured temperature, that can change quickly, with non-linear thermal time constant information to derive the environmentally-influenced internal temperature of the battery 14. The processor 26 uses this knowledge of the internal battery temperature and a known relationship/function of internal battery temperature to provide the internal battery temperature to the charger 16 to enable the battery charger 16 to determine a desired float voltage over a wide range of temperatures. The processor 26 could, however, be configured and coupled to the charger 16 to control the float voltage provided by the charger 16 to the battery 14.

Figure 4:
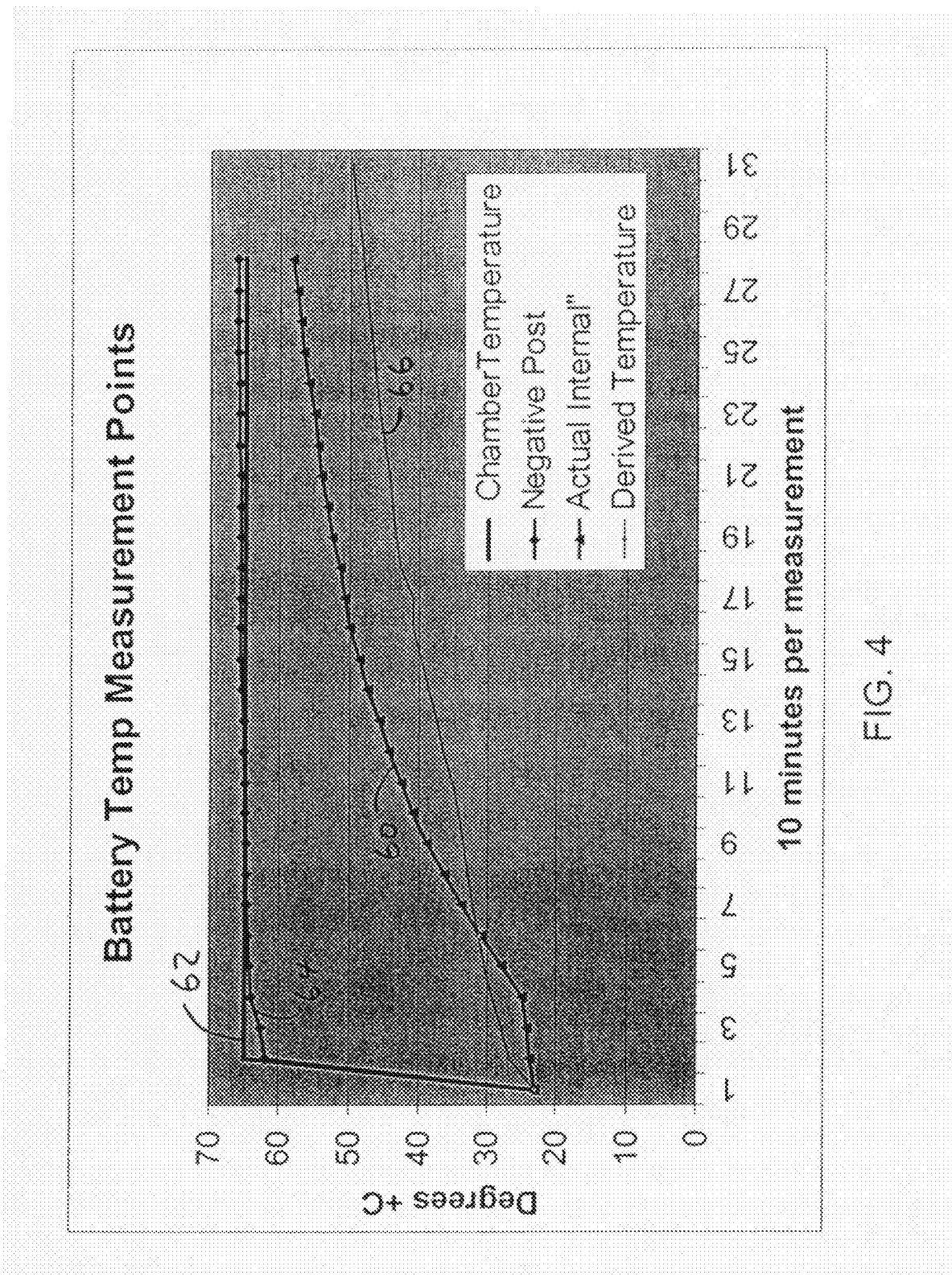
FIG. 4 is a graph of ambient temperature, negative battery terminal temperature, actual internal battery temperature, and estimated internal battery temperature versus time.

The processor 26 is configured to implement an algorithm to provide temperature information to control the float voltage of the charger 16 to maintain the current provided to the battery 14 substantially constant during float charging of the battery 14. The float voltage can be controlled non-linearly by the information from the processor 26 to help maintain the charge current essentially constant. The algorithm preferably simulates both a temperature constant of a thermal mass of the battery 14 through a thermal propagation delay affected by the ambient temperature and matching the multiple mechanical components with the thermal path from the exterior of the battery 14 to its interior. The internal battery temperature was plotted by embedding a temperature sensor in the center of a typical size battery mass and measuring the actual temperature changes in timed intervals in response to a step change in the test environment. In this manner a curve shape was established and a computer program was used to determine the thermal time constant. Referring also to FIG. 4, the thermal propagation delay results in the actual internal temperature 60 of the battery 14 lagging changes in the external ambient temperature 62 as shown. Further, the temperature 64 of the negative post 32 of the battery 14 tracks the external ambient temperature closely and is therefore of little use in determining the internal battery temperature. Indeed, using the negative post temperature 64 will likely lead to improper adjustments of the charger float voltage. While it is customary in the industry to monitor the negative post temperature because this location was believed to closely track the internal battery temperature, FIG. 4 shows that this assumption has been incorrect.

Preferably, the algorithm implemented by the processor 26 to estimate the internal battery temperature includes weighted averaging of previous algorithm values and a sequence of calculated values based upon the ambient temperature, the sequence being akin to a "bucket brigade." While many different algorithms may be used, the processor 26 may implement the following exemplary algorithm. The input to the bucket brigade (buckets) is a weighted average of the bucket's previous value and the new value (the current ambient temperature), with the weighting favoring the previous value. For example, $bucket_0=[(2*bucket_0)+new\text{-}value]/3$. The second stage in the bucket brigade does a weighted average of its previous value with the value from the previous stage: $bucket_1=[(2*bucket_1)+bucket_0]/3$. The succeeding stages are similar except that the final stage (here, $bucket_5$) is a much more diluted weighted average: $bucket_5=[(120*bucket_5)+bucket_4]/121$. The final stage, $bucket_5$ in this exemplary implementation, is the output. Other embodiments are possible, such as embodiments using different weightings for different stages. The exemplary embodiment described can be represented as follows:

TempHist[0]=(TempHist[0]*delay+AmbientTempData)/(delay+1)

TempHist[1]=(TempHist[1]*delay+TempHist[0])/(delay+1)

TempHist[2]=(TempHist[2]*delay+TempHist[1])/(delay+1)

TempHist[3]=(TempHist[3]*delay+TempHist[2])/(delay+1)

TempHist[4]=(TempHist[4]*delay+TempHist[3])/(delay+1)

TempHist[5]=(TempHist[5]*rate+TempHist[4])/(rate+1)

BattTempData=TempHist[5]; // update with change delay=2;
rate=120.
In simplified form:

$Temp\ Hist_n = (TempHist_n \cdot X_n + TempHist_{n-1})/(X_n+1)$ where $X_n$ are constants, n varies from 1 to N, with N being the number samples, and where, here, $X_N$ accounts for thermal mass of the battery 14 and thermal resistance at an exterior casing of the battery 14 and the surrounding atmosphere and differs from $X_1$-$X_{N-1}$, which account for internal heat transfer in the battery 14.

AmbientTempData is the current ambient temperature sensed by the sensor 18 and sampled by the processor 26. The processor 26 is configured to initialize the buckets, e.g., to the ambient temperature at startup, and to periodically sample the ambient temperature, e.g., once per minute. Thus, the exemplary bucket brigade represents five minutes of data. Other initialization values and sample rates than those provided as examples here may be used. Applying the algorithm, the processor 26 has been shown to produce an estimated internal battery temperature 66 (FIG. 4) that closely tracks the variation in actual internal battery temperature. The exemplary estimated temperature follows an exponential-like pattern similar to the actual internal temperature.

The weighted average of this algorithm helps to simulate the thermal time constant of the components involved (e.g., the plastic battery case, gelled lead acid, and battery plates). The bucket brigade (i.e., the series aspect of the temperature change algorithm) helps to simulate the successive heat transfer from ambient air temperature through the battery components to the internal battery temperature. The delay value of 2 simulates the heat transfer inside the battery 14 among relatively thermally conductive materials. The rate value of 120 simulates the very large time constant due to the high thermal resistance at the air-case interface (due to relatively low thermal conductivity of the case) and the relatively large overall thermal mass of the battery 14. The ordering shown, with the large "rate" value being last in the sequence, is exemplary and not limiting. Other orders, e.g., accounting for the large time constant due to the air-case interface and battery thermal mass earlier than the last sequence calculation, could be used.

The processor 26 is further configured to control the float voltage supplied by the charger 16. The processor 26 can monitor the float voltage and charge current supplied by the charger 16. Using a known relationship between float voltage, current, and internal battery temperature, given the internal temperature of the battery 14 derived by the algorithm above, the charger 16 can determine the float voltage for a desired current. The processor 26 can further send control signals to the charger 16 to control the float voltage provided by the charger 16 to the battery 14.

Figure 5:
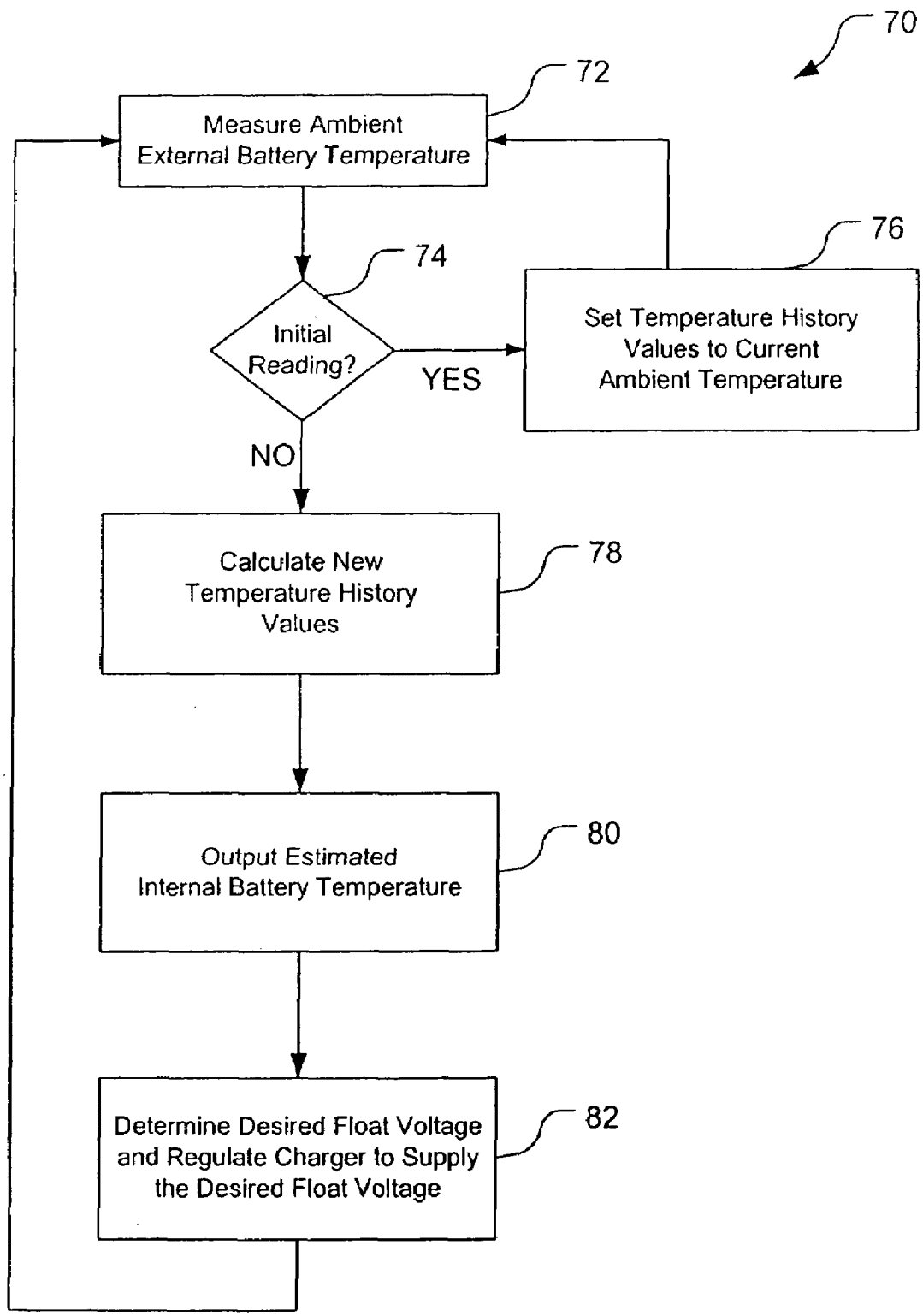
FIG. 5 is a block flow diagram of a process of estimating internal battery temperature and controlling battery charger float voltage.

In operation, referring to FIG. 5, with further reference to FIGS. 1 and 4, a process 70 for estimating the internal temperature of the battery 14 using the system 10 includes the stages shown. The process 70, however, is exemplary only and not limiting. The process 70 may be altered, e.g., by having stages added, removed, or rearranged. The process 70 estimates the internal battery temperature using the measured ambient temperature and without using a temperature of the negative battery post 32, although other embodiments of the inventions (including using the negative post temperature) are possible. As the negative post temperature essentially equals the ambient temperature, the negative post temperature could be used by the processor to estimate the internal battery temperature (e.g., replacing the ambient temperature in the exemplary algorithm). Preferably, only the ambient temperature or the negative post temperature is used as the two temperatures are essentially the same (with some lag in the negative post temperature for quick changes in the ambient temperature).

At stage 72, values of the ambient temperature are measured by the temperature sensor 18 and provided to the processor 26. The sensor 18 measures the temperature and the processor 26 periodically samples the output of the sensor 18.

At stage 74, an inquiry is made as to whether this is the initial pass through stage 74 for this use of the process 70. If so, then the process 70 proceeds to stage 76 where the TempHist values of the algorithm implemented by the processor 26 are all set to the current temperature indicated by the sensor 18 and the process 70 returns to stage 72 for further temperature sampling. If this is not the initial pass through stage 74, then the process proceeds to stage 78.

At stage 78, new TempHist values are calculated. The processor 26 replaces the TempHist values in turn, starting with TempHist[0] and proceeding to the last value, here TempHist[5]. The algorithm accounts for delays in changes of the ambient temperature to changes in the internal battery temperature and in degrees of change induced in the internal battery temperature.

At stage 80, the processor 26 outputs the estimated value of the internal battery temperature. The processor 26 uses the last temperature value, here TempHist[5], as the estimated internal battery temperature.

At stage 82, the processor 26 uses the estimated value of the internal battery temperature to provide information to the charger 16 for use in compensating the float voltage. The charger 16 uses the temperature information and the known relationship between internal battery temperature, float voltage, and current to adjust, as appropriate, the supplied float voltage to maintain the supplied current substantially constant.

Figure 6:
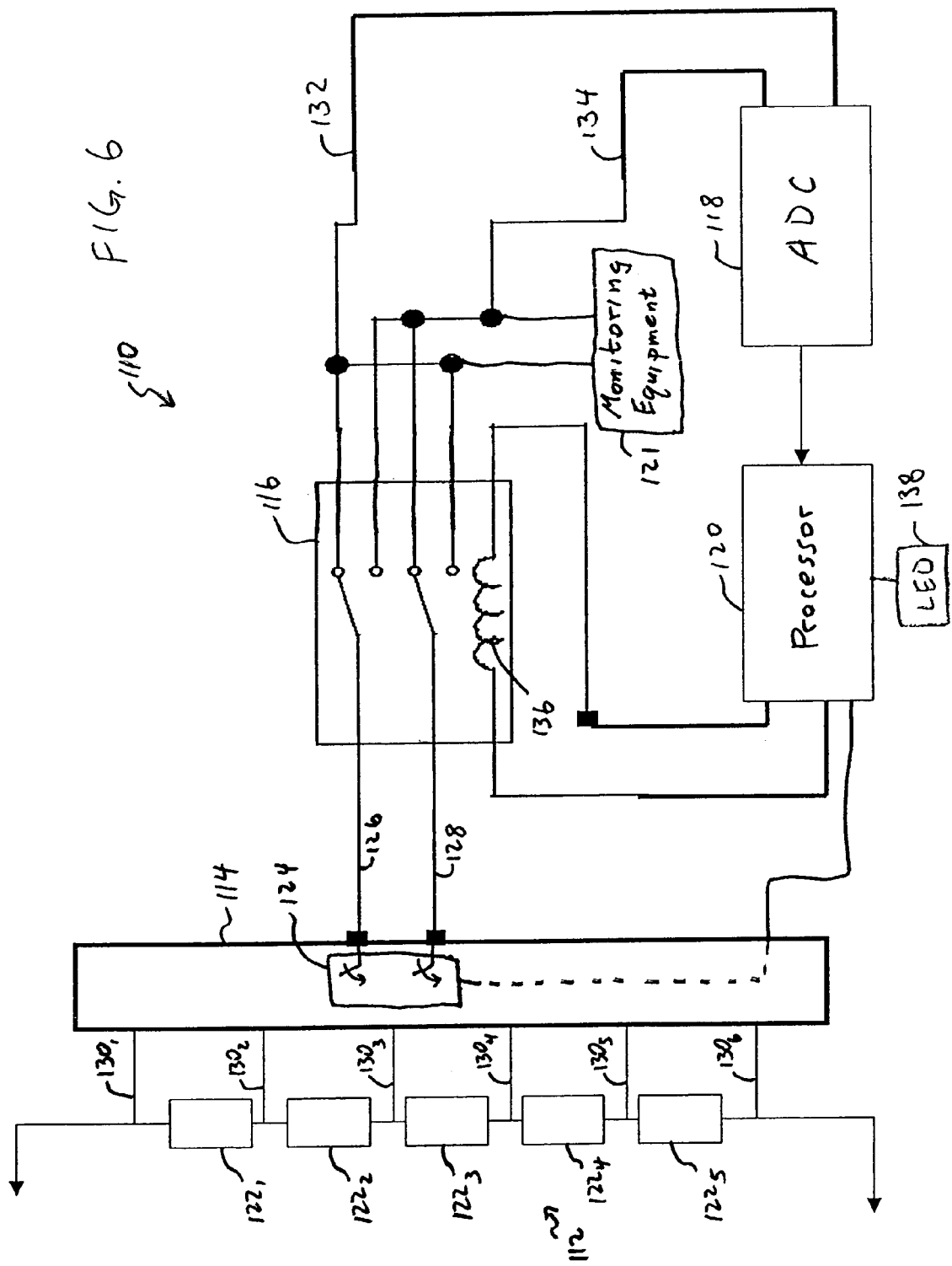
FIG. 6 is a simplified block diagram of a battery monitoring system.

Referring to FIG. 6, a battery monitoring system 110 includes a battery 112, a selection multiplexer (MUX) 114, a switch 116, an ADC 118, a processor 120, and monitoring equipment 121. The battery 112 is a series-connected set of batteries $122_1$-$122_5$. While five batteries 122 are shown, other quantities of the batteries (e.g., 200, 300, fewer than five, more than 300, etc.) may be used. For clarity, amplification and isolation circuitry that is preferably disposed between the MUX 114 and the ADC 118 (e.g., between the switch 116 and the ADC 118) is omitted from FIG. 6. The system 110 is configured to automatically adapt to the polarity of the battery 112 so that the battery 112 need not be connected to the MUX 114 in a particular polarity. The batteries 122 are connected in series in sequence of polarity (i.e., negative to positive) and are physically connected, e.g., strapped together, to keep the batteries 122 together, yet allow the batteries 122 to be individually replaced.

The MUX 114 is configured to selectively connect one of the batteries 122 to the switch 116. The MUX 114 includes a switch 124 that is connected to lines 126, 128 that couple to the switch 116 and that are selectively connected, under control of the processor 120, to two lines 130 at a time that are disposed on either side of a desired one of the batteries 122. The processor 120 controls the switch 124 to either couple to none of the lines 130 or to couple to a pair of the lines 130.

The switch 116 is a double-pole, double-throw relay that is configured to selectively couple the lines 126, 128 to output lines 132, 134 that are connected to the ADC 118. The switch 116 is shown in its relaxed, primary position coupling the input line 126 to the output line 132 and coupling the input line 128 to the output line 134. The existing, normally positive, multiplexed battery matrix junction line 126 is connected to the polarity reversal relay normally closed contact of pole #1 and the normally negative matrix junction line 128 is connected to the normally closed contact of pole #2. The normally open contact of pole #1 is attached to the normally closed contact of pole #2. The normally closed contact of pole #1 is connected to the positive input to the monitoring system 121 and the normally closed contact of pole #2 is connected to the negative input to the monitoring system 121. If current flows through a coil 136, then the switch 116 actuates to its secondary position coupling the input line 126 to the output line 134 and coupling the input line 128 to the output line 132.

The ADC 118 and processor 120 are configured to analyze the input voltage from the selected battery 112 and adjust the switch for the polarity of the battery 122. The ADC 118 is configured to provide a digital output signal indicative of an analog voltage received on the lines 132, 134. The processor 120 is configured to cycle the switch 124 of the MUX 114 to connect to each of the batteries 122, preferably in sequence. The processor 120 is further configured to selectively actuate the switch 116 by providing current through the coil 136 based on the indication of voltage received from the ADC 118.

The monitoring equipment 121 is configured to determine whether a connected battery 122 is failing, and provide a corresponding indication. The equipment 121 can determine that there is an error with the connected battery 122. For example, the equipment 121 can determine that the voltage as indicated by the signal received from the ADC 118 is too high or too low (e.g., above an upper threshold or below a lower threshold), or otherwise undesirable or unacceptable. The monitoring equipment 121 can provide an output that indicates the failure and which battery 122 is failing by indicating the lines 130 surrounding the failing battery (e.g., the lines $130_2$ and $130_3$ to indicate that the battery $122_2$ is failing). The MUX 114 is preferably visibly labeled with the line numbers for the lines 130. The monitoring equipment 121 is controlled by the processor 120 such that the equipment will not accept the voltage on the lines 132, 134 to monitor the connected battery 122 unless the processor 120 approves. The processor 120 will approve of this if the processor 120 has determined, or controlled the switch 116 to ensure, that the polarity of the battery 112 is as desired (e.g., positive on line 132 and negative on line 134) to help prevent damage to components of the equipment 121, e.g., due to reverse biasing the components.

Figure 7:
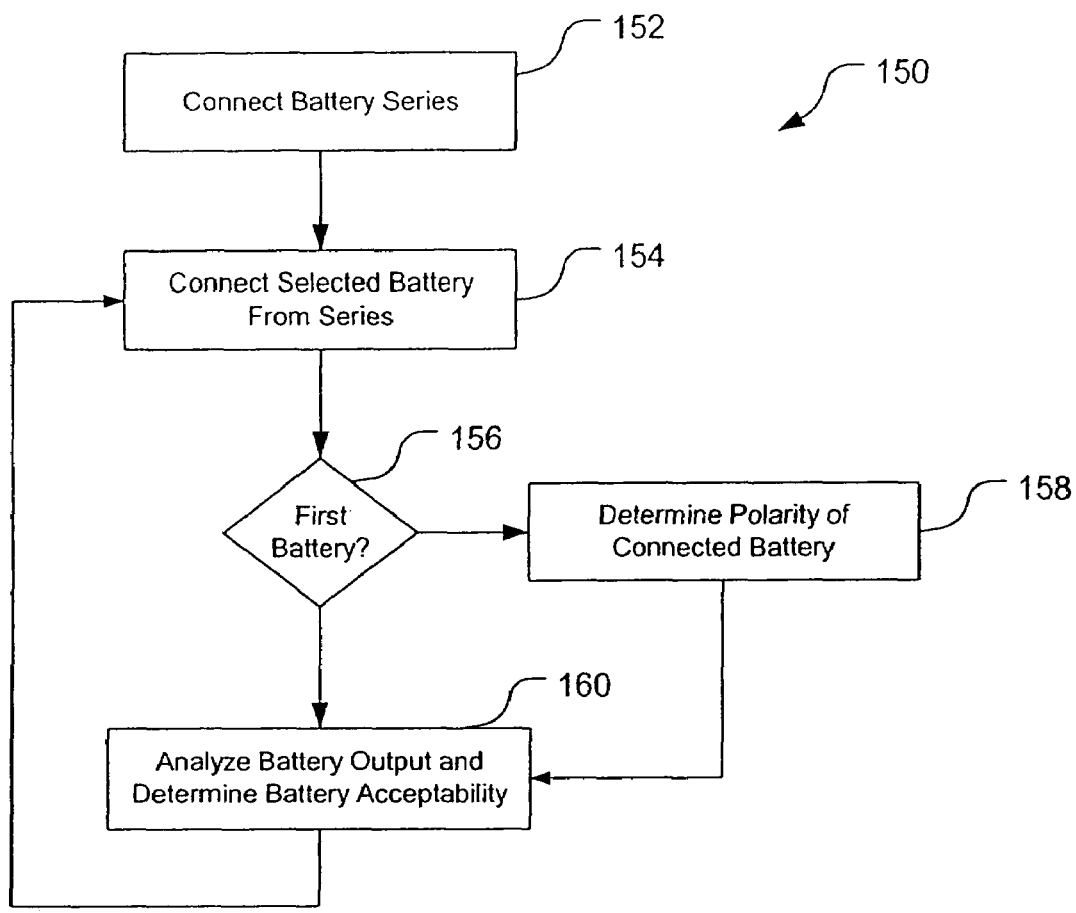
FIG. 7 is a block flow diagram of a process of automatically adapting to a polarity of a battery in the system shown in FIG. 6 and monitoring the battery.

Using the system 110, pre-existing physical labeling for the batteries 122 on the MUX 114 can remain unchanged and can be correlated with corresponding connected batteries 122 regardless of the polarity of the connected series 112. Without using the invention, if the lead 130, was expected to be connected to a positive end of the series-coupled batteries 112, then if the negative end was actually connected to the line $130_1$, the monitoring equipment 121 would receive the wrong polarity voltage. The system 110 would need to be rewired and the batteries 122 referred to in reverse order to correspond with the physical labeling (e.g., what the monitoring equipment believes should be the battery $122_2$ would actually be the battery $122_4$ and would need to be referred to as the battery $122_4$). In operation, referring to FIG. 7, with further reference to FIG. 6, a process 150 for monitoring batteries using the system 110 includes the stages shown. The process 150, however, is exemplary only and not limiting. The process 150 may be altered, e.g., by having stages added, removed, or rearranged.

At stage 152, the battery 112 is connected to the MUX 114. A user can connect the battery 112 to the MUX 114 without regard to the polarity of the battery 112.

At stage 154, the processor 120 causes the MUX 114 to connect one of the batteries 122 to the switch 116. The processor 120 causes the switch 124 to connect the lines 126, 128 to two of the lines 130.

At stage 156, an inquiry is made as to whether this is the first battery 122 to be monitored since connection of the battery 112 to the MUX 114, or activation of the system 110. If this is not the first battery 122, then the process 150 proceeds to stage 160. If this is the first battery, then the process 150 proceeds to stage 158.

At stage 158, the processor 120 analyzes the voltage indicated by the ADC 118 to determine polarity of the voltage on the line 132, 134. The processor 120 assumes the line 132 to be a positive line and the line 134 to be a negative line. If the voltage is positive (the potential on the line 132 is the same as or higher than the potential on the line 134), then the processor 120 signals the monitoring equipment 121 to begin operating. If the voltage is a zero voltage or lower (indicating the line 134 is at a higher potential than the line 132), then the processor 120 determines that the battery series 112 is reverse polarity (based on the assumption of positive and negative lines 132, 134), causes the switch 124 to open, then actuates the switch 116 by providing current through the coil 136. This causes the input 126, 128 to couple to the output lines 134, 132, respectively. The processor 120 then causes the switch 124 to re-couple the previously selected battery 122 to the switch 116 and indicates to the monitoring equipment 121 to begin operating. Thus, the monitoring 121 will see a positive voltage, as indicated to the processor 120 by the ADC 118. The processor 120 also actuates and an LED 138 to indicate that the battery is reverse/negative polarity (versus the assumed/normal polarity).

At stage 160, the monitoring equipment 121 analyzes the voltage between the lines 132, 134 to determine whether the selected battery 122 is passing or failing. If the selected battery's voltage is acceptable, then the process 150 returns to stage 154 for selection of a different pair of lines 130 such that each battery 122 is selected, preferably in sequence, and the batteries 122 are cyclically selected. If the selected battery's voltage is unacceptable, then an error is indicated by the monitoring equipment 121 and the process returns to stage 154.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. Further, non-software items shown as separate units may be combined (such as the voltage sensor 22 and the ADC 24 shown in FIG. 1) and/or items shown as single units may be separated into multiple units.

Also, the processor 120 shown in FIG. 6 may cause the MUX 114 to connect multiple batteries 122 to the switch 116 at the same time. The processor 120 could evaluate the group of connected batteries and if a failure is possible, then cause the MUX 114 to connect smaller subsets, e.g., individual ones, of the batteries 122 to the MUX 114 to assist in determining which of the batteries 122 is/are failing. Further, the process 150 could be modified so that the processor 120 checks the polarity of each battery 122 each time it is connected to the MUX 114, e.g., to guard against batteries 122 that have been replaced in the series 112 with a polarity reversed with respect to at least another battery 122 in the series 112. Further, while devices in the figures are shown for illustrative purposes as being connected by wires or the other lines, the devices may communicate by other means, e.g., wirelessly, and thus the devices are coupled a appropriate (e.g., wired, wirelessly, both) to convey the corresponding information. Further still, the monitor 121 can include a charger of its own that can sends voltages to the battery 14, or individual batteries that make up the battery 14, monitor the current that this charger supplies and use a known relationship of the voltage, current, and internal battery temperature to determine the internal battery temperature. This determined temperature can be compared with the estimated internal battery temperature derived through the bucket brigade algorithm and remedial action taken if appropriate (e.g., replacing/repairing a battery, adjusting the algorithm, etc.).

What is claimed is:

1. A battery monitoring system comprising:
   a system input configured to couple to a battery;
   a switch having first and second switch inputs coupled to the system input and having first, second, third, and fourth switch outputs;
   circuitry configured to monitor at least one characteristic of the battery, the circuitry having positive and negative inputs coupled to the switch; and
   a processor coupled to the switch and to the circuitry and configured to:
      determine a polarity of a voltage provided by the battery through the system input and the switch;
      cause the switch to connect the first and second switch inputs selectively to an appropriate pair of the switch outputs depending upon the determined polarity of the voltage; and
      cause the circuitry to accept the voltage from the switch after the processor causes the switch to connect the switch inputs to the appropriate pair of the switch outputs.

2. The system of claim 1 wherein the processor is configured to cause the switch to connect the first and second switch inputs, respectively, to either the first and third switch outputs or to the second and fourth switch outputs.

3. The system of claim 1 wherein the positive input of the circuitry is coupled to the first and fourth switch outputs and the negative input is coupled to the second and third switch outputs.

4. The system of claim 1 wherein the battery comprises a plurality of batteries connected in series, wherein the system input is configured to selectively couple a respective one of the series of batteries to the switch inputs, and wherein the processor is coupled to the system input and is configured to control the system input to disconnect from all the batteries while the processor causes the switch to change which switch outputs are connected to the switch inputs.

5. The system of claim 4 wherein the processor is configured to keep the switch in a constant position while causing the system input to cyclically connect to each of the batteries in the series of batteries.

6. A method of monitoring a series of batteries of arbitrary group polarization, the method comprising:
receiving a voltage from a battery of the series of batteries on first and second lines;
automatically determining which of the lines is at a relatively higher potential and which of the lines is at a relatively lower potential;
automatically coupling a positive input of monitoring equipment to the line determined to be at a relatively higher potential;
automatically coupling a negative input of monitoring equipment to the line determined to be at a relatively lower potential;
using the voltage in the monitoring equipment only after the determining and coupling;
changing which of the positive and negative inputs of the monitoring equipment is coupled to the first and second lines, respectively; and
inhibiting receipt of voltage from the series of batteries on the first and second lines while changing which of the positive and negative inputs of the monitoring equipment is coupled to the first and second lines, respectively.

7. The method of claim 6 further comprising selectively connecting each battery of the series of batteries one at a time to the monitoring equipment.

8. The method of claim 7 wherein which of the positive and negative inputs of the monitoring equipment that each of the first and second lines is coupled to is the same for each selective connection of the batteries.

9. An apparatus comprising:
a battery module comprising a plurality of batteries connected in series;
selection multiplexer means, coupled to the battery module, for responding to a first control signal to select from which of the batteries to receive battery power and for providing a multiplexer power output;
switch means, coupled to the selection multiplexer means, for receiving the multiplexer power output on first and second switch inputs and for responding to a second control signal to couple the first and second switch inputs to either first and third switch outputs or to second and fourth switch outputs, respectively, to provide one of a first power output and a second power output;
status monitor means, coupled to the switch means, for displaying information about the battery module;
analog-to-digital converter means, coupled to the switch means, for outputting a digital signal corresponding to the first and second power outputs; and
processor means, coupled to the analog-to-digital converter means, for receiving the digital signal from the analog-to-digital converter means, for sending the first control signal to the selection multiplexer means and for sending the second control signal to the switch means.

10. The apparatus of claim 9 wherein the selection multiplexer means includes a selectable input connection for each battery in the battery bank.

11. The apparatus of claim 10 wherein the status monitor means is further for displaying information about each battery in the battery module.

12. The apparatus of claim 9 wherein the processor means is further for determining a polarity of the battery power received by the selection multiplexer means.

13. The apparatus of claim 12 wherein the second control signal sent by the processor means is based on the polarity of the battery power received by the selection multiplexer means.

* * * * *